United States Patent
Wu et al.

(10) Patent No.: US 7,224,541 B2
(45) Date of Patent: May 29, 2007

(54) ZOOM LENS

(75) Inventors: Ching-Chin Wu, Hsinchu (TW); Chir-Weei Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 108 days.

(21) Appl. No.: 11/113,184

(22) Filed: Apr. 25, 2005

(65) Prior Publication Data
US 2006/0119957 A1 Jun. 8, 2006

(30) Foreign Application Priority Data
Dec. 8, 2004 (TW) .............................. 93138025 A

(51) Int. Cl.
G02B 9/14 (2006.01)

(52) U.S. Cl. .................. 359/784; 359/761; 359/787
(58) Field of Classification Search ............... 359/787, 359/761, 784
See application file for complete search history.

(56) References Cited

U.S. PATENT DOCUMENTS

| 5,550,679 A * | 8/1996 | Sugawara .................... 359/689 |
| 6,362,924 B2 * | 3/2002 | Ohno ......................... 359/689 |
| 6,757,111 B2 | 6/2004 | Takeuchi et al. |
| 2004/0012859 A1 | 1/2004 | Minefuji |
| 2004/0136705 A1 | 7/2004 | Suzuki |

* cited by examiner

Primary Examiner—Ricky Mack
Assistant Examiner—Joseph Martinez
(74) Attorney, Agent, or Firm—Rabin & Berdo, P.C.

(57) ABSTRACT

A zoom lens formed in a small size adaptable to a thin and portable device, having three lens groups, including, from the object plane to the image forming plane: a first lens group with a negative power, a second lens group with a positive power and a third lens group with a positive power. By controlling the ratio of the focal length of the second lens group and the focal length of the tele-photo end, image distortion may be controlled, and the total length of the lens may be reduced to shrink the size of the lens. Hence production costs may be reduced, which is important to mass production.

17 Claims, 5 Drawing Sheets

ZOOM LENS

FIELD OF THE INVENTION

The present invention relates to a zoom lens for digital picture taking apparatus such as digital cameras, digital video cameras and the like and particularly to a small zoom lens that has a compact structure and may be fabricated at a low cost and is adaptable to portable devices such as handsets.

BACKGROUND OF THE INVENTION

With the camera-embedded handset becoming very fashionable these days, the demand for a small picture taking lens that is thin and cheap grows tremendously. Besides the fixed focus lens module now widely used, the zoom lens module is a growing trend.

In the past, the zoom lens had to include at least six glass lenses to achieve two to three times of the zoom ratio. The total length of the lens is not suitable for thin portable devices.

In conventional techniques, U.S. Pat. No. 6,757,111 discloses a simple zoom lens with three times of zoom ratio. It contains six glass lenses. Three of them are Aspherical glass lenses. The length of the lens is about 9.4 times of the image height. It is too lengthy and expensive for camera handsets. U.S. publication No. 20040012859 has a lens with a length about 8.6 times of the image. It is also lengthy, and provides a lower zoom ratio (only two times). U.S. publication No. 20040136705 discloses a zoom lens of three zoom ratios, but the length of the zoom lens is about ten times of the image height. It is too lengthy to be used in a thin product.

Hence there is an urgent need to develop a small zoom lens with fewer glass lenses and more plastic elements to reduce production costs and meet market requirements.

SUMMARY OF THE INVENTION

In view of the aforesaid problems, the primary object of the present invention is to provide a small zoom lens that is cheaper and has a compact mechanism and is suitable for use on portable devices such as handsets, to overcome the problems occurring to conventional techniques.

To achieve the foregoing object, the zoom lens of the invention has three lens groups arranged from close to the object plane to the image forming plane, including a first lens group which is a negative power lens set, a second lens group which is a positive power lens set and a third lens group which is a positive power lens set. The second lens group has to meet the following condition:

$$0.4 < |f2/fT| < 0.6$$

where f2 is the focal length of the second lens group; and fT is the focal length of the zoom lens at tele-photo.

The zoom lens of the invention adopts a design to limit the total length of the lens, and provide a zoom ratio of 2–3. The maximum number of glass lenses is only one or two. The zoom lens thus constructed is thin and light, and can provide high quality images at a lower cost.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1A:
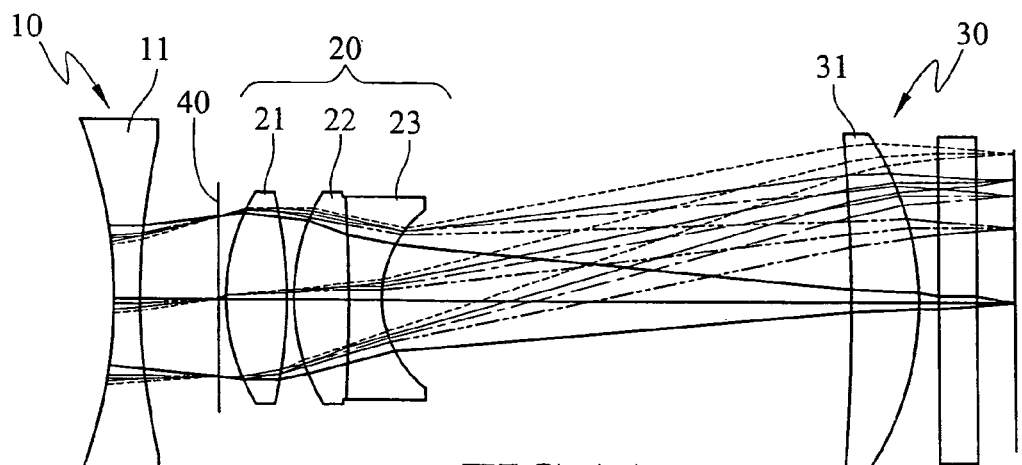
FIGS. 1A, 1B and 1C are schematic views of the tele-photo end, middle end and wide angle end of the zoom lens of the invention.
Figure 1B:
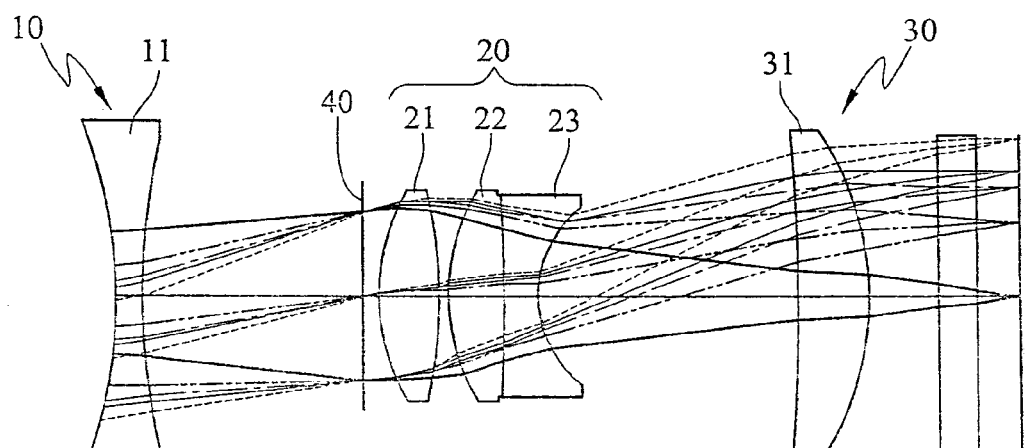
Figure 1C:
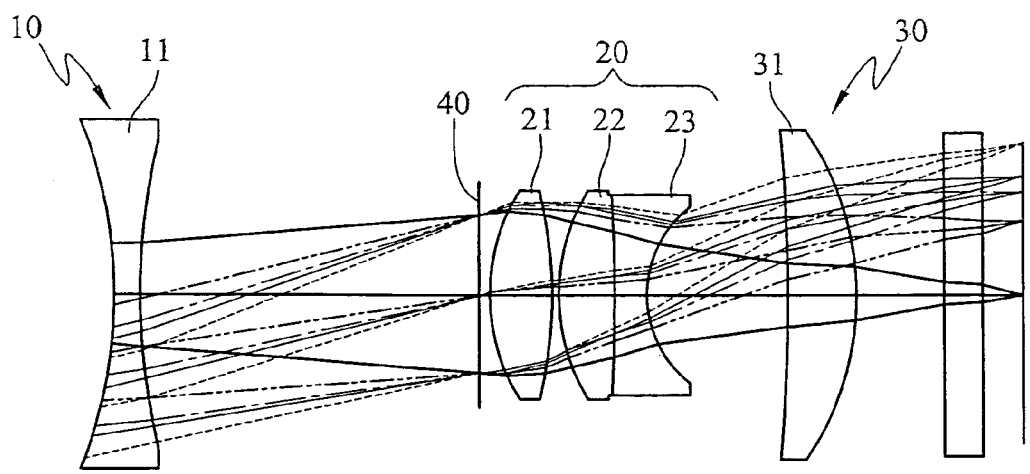

Refer to FIGS. 1A through 1C for the tele-photo end, medium end and wide-angle end of the zoom lens of the invention. Starting from the object plane (namely the object of which the picture has to be taken, i.e. the left side of the drawings), there are a first lens group 10, a second lens group 20 and a third lens group 30. The first lens group 10 is a negative power lens set, the second lens group 20 is a positive power lens set and the third lens group 30 is a positive power lens set.

As shown in the drawings, the embodiment of the invention uses only five lenses. Hence the number of lenses being used is reduced, and the total length of the lens also is shortened.

In the embodiment, the first lens group 10 includes a first lens 11, the second lens group 20 includes a second lens 21, a third lens 22 and a fourth lens 23, and the third lens group 30 includes a fifth lens 31.

In the first lens group 10, the first lens 11 is a negative lens with a concave surface facing the object so that, when used for a long focal length, the rear priaciple plane is moved forwards to shorten the total length of the lens. In this embodiment the surface of the first lens 11 facing the image-forming plane also is concave. This is not a limitation in practice, and has to be altered with the length of the lens. Moreover, the first lens 11 has to meet the following condition:

$$Vd \geq 50$$

where Vd is the Abbe number of the zoom lens.

In the second lens group 20, the second lens 21 is a positive lens, the third lens 22 is a positive lens and the fourth lens 23 is negative lens 23. And the second lens group 20 has to meet the following condition:

$$0.4 < |f2/fT| < 0.6$$

where f2 is the focal length of the second lens group; and fT is the focal length of the zoom lens at the tele-photo.

The focus design of the second lens group 20 aims to control and enhance the total optical focus of the second lens group 20, reduces distortion thereof, and shortens the moving distance of the second lens group while zooming.

The fifth lens 31 in the third lens group 30 is a positive lens to control the incident angle entering the photosensitive element. It is used for focusing when the object distance has changed. As it is a single lens structure, it can reduce power consumption of the actuator and increase focusing speed.

In the invention, the stop 40 is located between the second lens group 20 and the third lens group 30. While the focal length of the zoom lens alters the relative position of the stop 40 and the second lens group 20 is fixed, namely the stop 40 is moved with the second lens group 20, to maintain a constant distance there between.

When the focal length of the zoom lens changes from a long focal length (tele-photo end) to a short focal length (wide angle end), the second lens group 20 and the stop 40 are moved together from the object plane to the image forming plane (namely to the right side in the drawings), and the first lens group 10 and the third lens group 30 are moved corresponding to the second lens group 20.

The following is a number of embodiments to elaborate the configurations of the zoom lens according to the invention.

Embodiment 1

Figure 2:
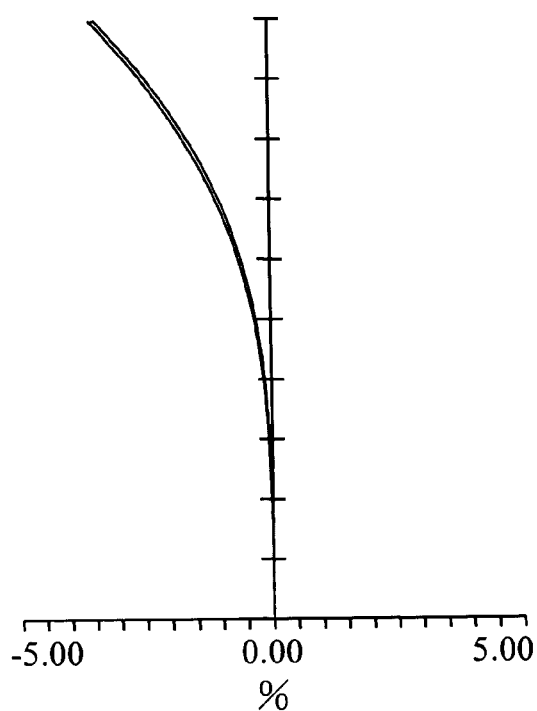
FIGS. 2, 3 and 4 are charts showing a short focal length distortion, a medium focal length relative illumination, and a long focal length optical transmission function MTF of a first embodiment of the invention.
Figure 3:
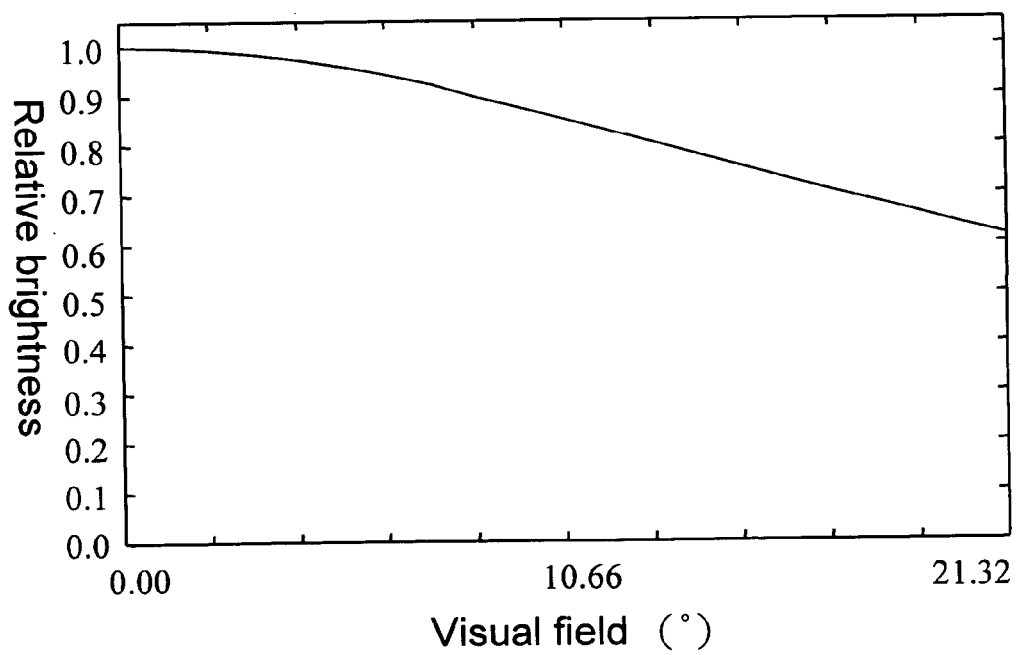
Figure 4:
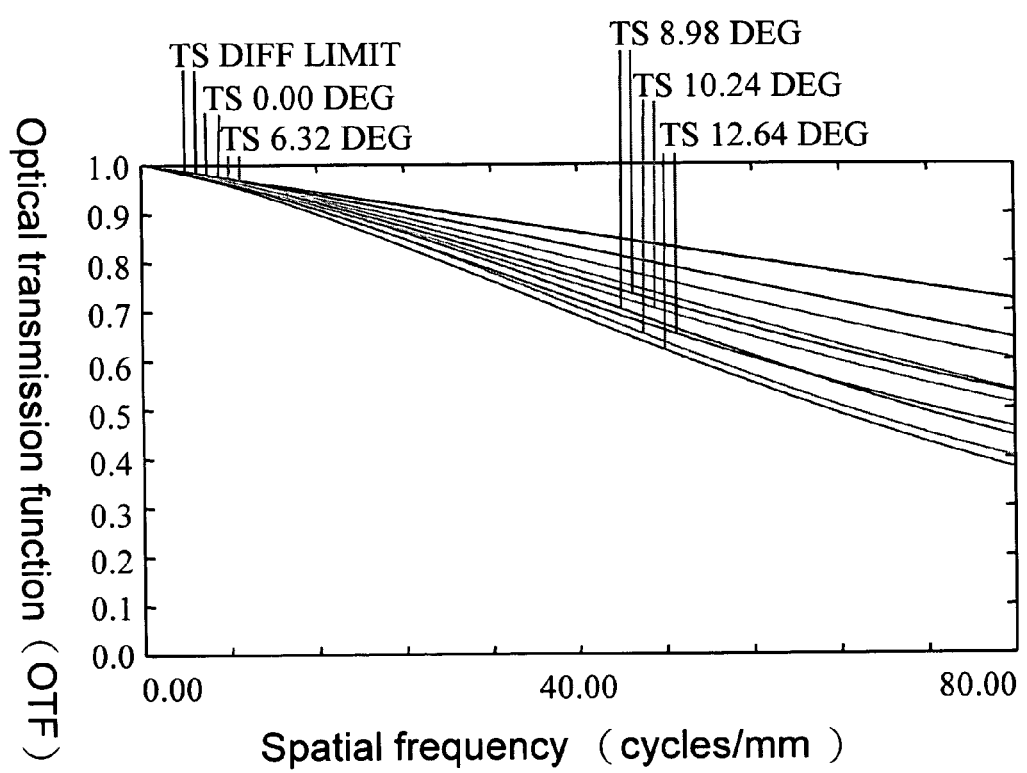

Refer to Tables 1 and 2 for the test data and specification data of this embodiment. FIGS. 2, 3 and 4 show the short focal length distortion, medium focus illumination and long focal length optical transmission function MTF of the embodiment.

TABLE 1

| f(mm) | 5-7-12.22 |
|---|---|
| F/# | 2.6-3.2-4.7 |
| Zoom | 2.5x |
| T(mm) | 16.5-15.8-16.5 |
| HFOV | 30.2-21.3-12.6 |
| Vd | 81.6 |
| f2/fT | 0.4911 |

Embodiment 2

Figure 5:
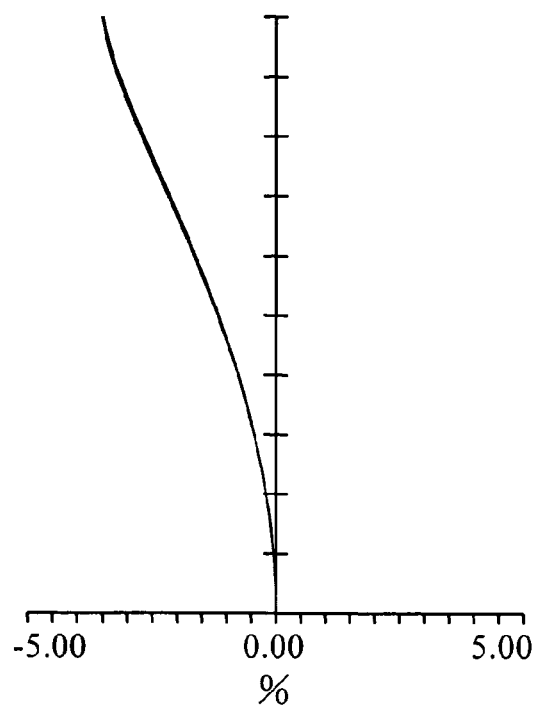
FIGS. 5, 6 and 7 are charts showing a short focal length distortion, a medium focal length relative illumination, and a long focal length optical transmission function MTF of a second embodiment of the invention.
Figure 6:
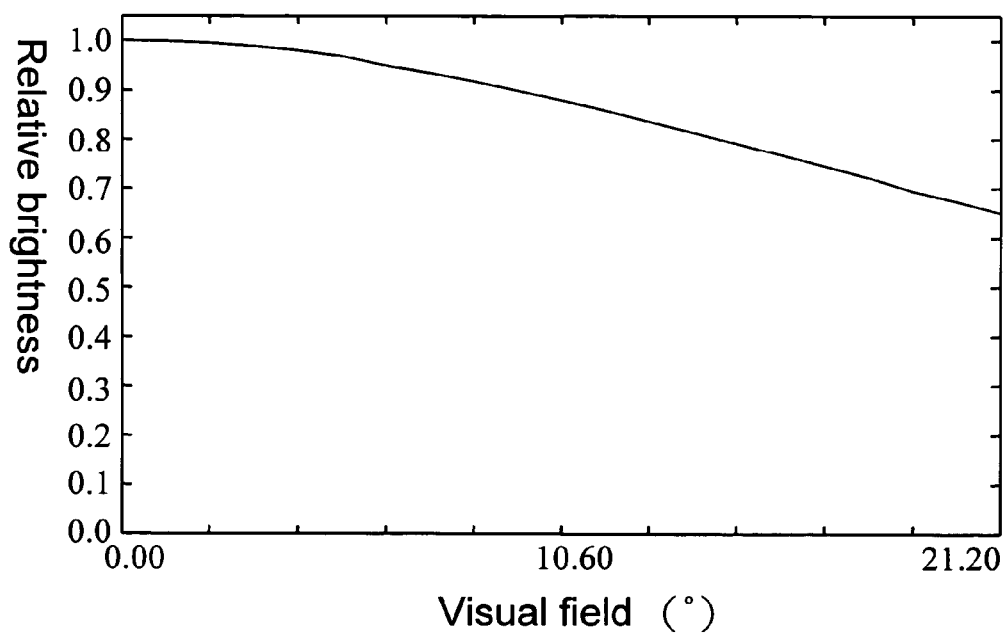
Figure 7:
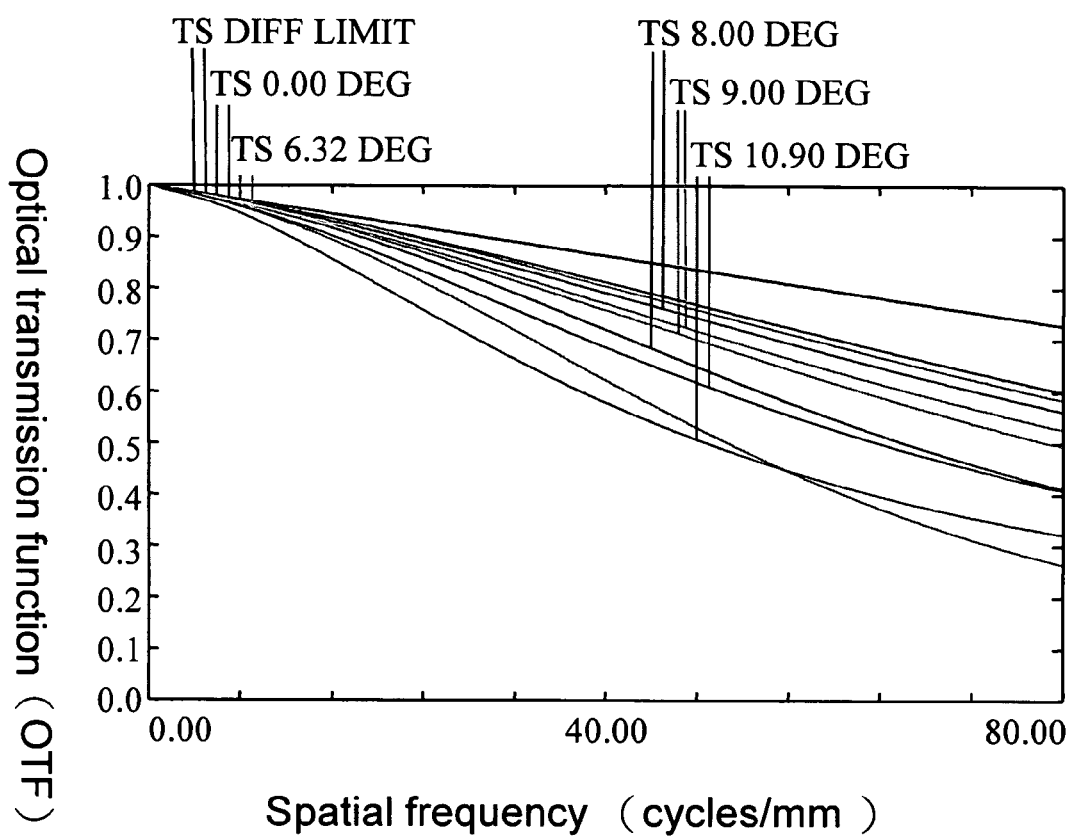

Refer to Tables 3 and 4 for the test data and specification data of this embodiment. FIGS. 5, 6 and 7 show the short focal length distortion, medium focus illumination and long focal length optical transmission function MTF of the embodiment.

TABLE 3

| f(mm) | 5-7-14.9 |
|---|---|
| F/# | 2.8-3.2-4.6 |
| Zoom | 3x |
| T(mm) | 18.4-17.4-18.4 |
| FOV | 31.1-21.2-10.9 |
| Vd | 81.6 |
| f2/fT | 0.4456 |

TABLE 2

| Surf | R | Thickness | Material | K | A4 | A6 | A8 |
|---|---|---|---|---|---|---|---|
| 1 | −6.797875 | 0.5 | 1.497,81.6 | −4.226788 | 0.00034869 | 1.20E−05 | −9.97E−07 |
| 2 | 26.67525 | 6.229374 | | | 0.000900746 | 3.16E−05 | −1.10E−06 |
| STO | Infinity | 0.11 | | | | | |
| 4 | 3.756071 | 1.15 | 1.531,56 | −1.102466 | 0.00032579 | −0.000290085 | |
| 5 | −7.354004 | 0.1 | | −16.6995 | −0.002274249 | −7.77E−05 | |
| 6 | 3.682911 | 1 | 1.531,56 | −0.8999389 | | | |
| 7 | −22.22848 | 0.59 | 1.585,29.9 | 0 | | | |
| 8 | 1.904984 | 2.59453 | | −0.634 | −0.000172426 | 0.001971326 | −0.000326223 |
| 9 | −24.62835 | 1.3 | 1.531,56 | 9.520402 | −0.000114606 | 0.000110649 | −6.62E−07 |
| 10 | −4.027016 | 1.475521 | | −2.9275 | 7.55E−05 | | |
| 11 | Infinity | 0.75 | 1.517,64.2 | 0 | | | |
| 12 | Infinity | 0.7 | | | | | |

TABLE 4

| Surf | R | Thickness | Material | K | A4 | A6 | A8 |
|---|---|---|---|---|---|---|---|
| 1 | −7.628512 | 0.5 | 1.497,81.6 | −4.479637 | 0.000446347 | 3.65E−05 | −6.74E−07 |
| 2 | 35.66994 | 7.482897 | | 0 | 0.000997025 | 1.54E−05 | 3.64E−06 |
| STO | Infinity | 0.25 | | 0 | | | |
| 4 | 3.861124 | 1.61 | 1.531,56 | −0.9959885 | 0.000686797 | −0.000116046 | |
| 5 | −7.164988 | 0.1 | | −8.57E+00 | 9.54E−05 | −9.69E−05 | |
| 6 | 3.88442 | 1 | 1.531,56 | −2.324052 | | | |
| 7 | −42.20312 | 0.61 | 1.585,29.9 | 0 | | | |
| 8 | 1.81443 | 1.942198 | | −0.8915499 | −0.000901 | 0.001651 | −0.000065 |
| 9 | 243.5207 | 1.87 | 1.531,56 | 4509.944 | −0.00112714 | 0.000202684 | −7.66E−06 |
| 10 | −4.658001 | 1.584896 | | −2.55397 | −0.00035255 | | |
| 11 | Infinity | 0.75 | 1.517,64.2 | 0 | | | |
| 12 | Infinity | 0.7 | | 0 | | | |

Embodiment 3

Refer to Tables 5 and 6 for the test data and specification data of this embodiment.

TABLE 5

| f(mm) | 5-7-12.22 |
|---|---|
| F/# | 2.8-3.2-4.6 |
| Zoom | 2.5x |
| T(mm) | 17.7-16.6-17.7 |
| FOV | 30.2-21.3-12.6 |
| Vd | 81.6 |
| f2/fT | 0.42 |

TABLE 6

| Surf | R | Thickness | Material | K | A4 | A6 | A8 |
|---|---|---|---|---|---|---|---|
| 1 | −5.326163 | 0.5 | 1.497,81.6 | −6.911066 | 0.000904702 | −2.09E−05 | 4.58E−06 |
| 2 | 32.93141 | | | 0 | 0.003655147 | −0.000131686 | 2.50E−05 |
| STO | Infinity | 0.1 | | 0 | | | |
| 4 | 3.747409 | 1.46 | 1.69,53.2 | −0.75186 | −6.33E−05 | 0.000133356 | |
| 5 | −14.30057 | 0.1 | | −770.7946 | −0.00417093 | 0.001208389 | |
| 6 | 3.885421 | 1.2 | 1.531,56 | 1.154085 | | | |
| 7 | −6.192831 | 0.58 | 1.585,29.9 | 0 | | | |
| 8 | 1.825969 | | | −0.357038 | 0.009194998 | 0.002243146 | −0.00019985 |
| 9 | −42.34619 | 2.33 | 1.531,56 | −25112.47 | −8.42E−05 | 0.000208366 | 1.62E−06 |
| 10 | −4.40769 | | | −3.73044 | −3.10E−05 | | |
| 11 | Infinity | 0.75 | 1.517,64.2 | 0 | | | |
| 12 | Infinity | 0.7 | | | | | |

Embodiment 4

Refer to Tables 7 and 8 for the test data and specification data of this embodiment.

TABLE 7

| f(mm) | 5-7-12.22 |
|---|---|
| F/# | 2.8-3.2-4.6 |
| Zoom | 2.5x |
| T(mm) | 18.4-17.7-18.4 |
| FOV | 30.2-21.3-12.6 |
| Vd | 81.6 |
| f2/fT | 0.55 |

TABLE 8

| Surf | R | Thickness | Material | K | A4 | A6 | A8 |
|---|---|---|---|---|---|---|---|
| 1 | −5.865954 | 0.5 | 1.497,81.6 | −6.927923 | 0.000845173 | −3.86E−05 | 1.44E−06 |
| 2 | −454.2222 | | | 0 | 0.003483559 | −0.000190022 | 7.75E−06 |
| STO | Infinity | 0.1 | | 0 | | | |
| 4 | 3.44043 | 1.3 | 1.531,56 | −0.849279 | 0.000286226 | −0.000220877 | |
| 5 | −9.966787 | 0.1 | | −19.89263 | −0.00231265 | 3.03E−05 | |
| 6 | 4.147266 | 1.1 | 1.531,56 | −2.551739 | | | |
| 7 | −14.58847 | 0.58 | 1.585,29.9 | 0 | | | |
| 8 | 1.89906 | | | −0.6192082 | 0.001691149 | 0.001333248 | −0.000164 |
| 9 | −787.0524 | 1.44 | 1.531,56 | 14149.31 | 0.000274833 | 0.000149382 | −5.30E−06 |
| 10 | −4.85119 | | | −2.852473 | 4.06E−05 | | |
| 11 | Infinity | 0.75 | 1.517,64.2 | 0 | | | |
| 12 | Infinity | 0.7 | | 0 | | | | where f is respectively the focal length of the wide angle end, middle end and tele-photo end;

F/# is respectively the F number at the wide angle end, middle end and tele-photo end;

Zoom is the zoom ratio of the lens;

T is respectively the total length of the wide angle end, middle end and tele-photo end;

HFOV is respectively the maximum half view angle of the wide angle end, middle end and tele-photo end;

Vd is the Abbe number of the first lens of the zoom lens:

FT is the focal length of the tele-photo end of the zoom lens;

f2 is the focal length of the second lens group;

K is the Conic constant;

A4–A8 are high order asphencal coefficients

STO is the position of the stop; and

'Infinity' represents a planar surface

In summary, the invention provides a zoom lens with a more compact mechanism, and can better meet optical quality requirements by offering more pixels and high resolutions. Not only the number of lenses is lower (the present design uses only five lenses), the number of glass lenses may be reduced to 1 or 2. Hence the total weight of the zoom lens decreases, and production costs of the zoom lens also are reduced. In addition, the zoom lens may be made in a smaller size (T/H<5.9). It is adaptable to a thin portable device. Moreover, the brightness, visual angle and evenness are enhanced. The zoom ratio can reach three times.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A zoom lens comprising, from an object plane to an image plane:
   a first lens group having a negative power, the first lens group including a first lens which has a concave side facing the object plane;
   a second lens group having a positive power and meeting the conditions of $0.4<|f2/fT|<0.6$, where f2 is the focal length of second lens group, and fT is the focal length of the zoom lens at tele-photo;
   a third lens group having a positive power; and
   a third lens group having a positive power;
   wherein the zoom lens meets the condition of T/H <7, where T is the total length of the zoom lens, and H is the image height.

2. The zoom lens of claim 1, wherein the third lens group includes a lens which is a positive lens.

3. The zoom lens of claim 1, wherein the first lens is a negative lens.

4. The zoom lens of claim 1, wherein the first lens meets the condition of $Vd \geq 50$, where Vd is the Abbe number of the zoom lens.

5. A zoom lens comprising, from an object plane to an image plane;
   a first lens group having a negative power, the first lens group including a first lens which has a concave side facing the object plane;
   a second lens group having a positive power and meeting the conditions of $0.4<|f2/fT|<0.6$, where f2 is the focal length of second lens group, and fT is the focal length of the zoom lens at tele-photo; and
   a third lens group having a positive power, wherein the second lens group includes a second lens, a third lens and a fourth lens located from the object plane to the image forming plane, the second lens being positive power, the third lens being positive power, the fourth lens being negative power.

6. A zoom lens comprising, from an object plane to an image plane:
   a first lens group having a negative power;
   a second lens group having a positive power and meeting the conditions of $0.4<|f2/fT|<0.6$, where f2 is the focal length of second lens group, and fT is the focal length of the zoom lens at tele-photo, the second lens group including a second lens, a third lens and a fourth lens located from the object plane to the image plane, the second lens being positive power, the third lens being positive power, and the fourth lens being negative power; and
   a third lens group having a positive power.

7. The zoom lens of claim 6, wherein the first lens group includes a first lens which is a negative lens having a concave side facing the object plane.

8. The zoom lens of claim 7, wherein the first lens meets the condition of $Vd \geq 50$, where Vd is the Abbe number of the zoom lens.

9. The zoom lens of claim 7, wherein the third lens group includes a lens which is a positive lens.

10. The zoom lens of claim 7, wherein the zoom lens meets the condition of T/H <7, where T is the total length of the zoom lens, and H is the image height.

11. A zoom lens comprising, from an object plane to an image plane:
    a first lens group having a negative power;
    a second lens group having a positive power and meeting the conditions of $0.4<51$ $f2/fT|<0.6$, where f2 is the focal length of second lens group, and fT is the focal length of the zoom lens at tele-photo; and
    a third lens group having a positive power, wherein the zoom lens meets the condition of T/H<7, where T is the total length of the zoom lens, and H is the image height.

12. The zoom lens of claim 11, wherein the third lens group includes a lens which is a positive lens.

13. The zoom lens of claim 12, wherein the first lens group includes a first lens which has a concave side facing the object plane.

14. The zoom lens of claim 12, wherein the first lens meets the condition of $Vd \leq 50$, where Vd is the Abbe number of the zoom lens.

15. The zoom lens of claim 14, wherein the first lens group includes a first lens which has a concave side facing the object plane.

16. The zoom lens of claim 11, wherein the first lens group includes a first lens which is a negative lens having a concave side facing the object plane.

17. The zoom lens of claim 16, wherein the first lens meets the condition of $Vd \geq 50$, where Vd is the Abbe number of the zoom lens.

* * * * *